United States Patent
Fujimori et al.

(10) Patent No.: US 7,751,106 B2
(45) Date of Patent: Jul. 6, 2010

(54) IMAGE FORMING APPARATUS

(75) Inventors: Takashi Fujimori, Moriya (JP); Kenji Kuroki, Toride (JP); Hiroyuki Eda, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/641,026

(22) Filed: Dec. 17, 2009

(65) Prior Publication Data

US 2010/0092193 A1    Apr. 15, 2010

Related U.S. Application Data

(63) Continuation of application No. 11/736,411, filed on Apr. 17, 2007, now Pat. No. 7,643,190.

(30) Foreign Application Priority Data

Apr. 18, 2006   (JP) .............................. 2006-114314

(51) Int. Cl.
*G02B 26/08* (2006.01)
*G03G 15/00* (2006.01)

(52) U.S. Cl. .............. 359/201.2; 359/204.1; 359/216.1; 399/49; 399/61

(58) Field of Classification Search .................. None
See application file for complete search history.

(56) References Cited

U.S. PATENT DOCUMENTS

| 7,177,558 B2* | 2/2007 | Tanaka et al. ................. 399/39 |
| 2007/0064088 A1* | 3/2007 | Izumiya ...................... 347/261 |

* cited by examiner

*Primary Examiner*—James Phan
(74) *Attorney, Agent, or Firm*—Canon U.S.A., Inc. I.P. Division

(57) ABSTRACT

An image forming apparatus that previously rotates a polygonal mirror drive motor before starting a job and forms a latent image by using an optical scanning unit including the polygonal mirror drive motor is provided. The image forming apparatus includes a control unit configured to perform control such that, in the determination of the presence or absence of each of color toners before a previous rotation is started, if it is determined that any one of the color toners is absent, only the polygonal mirror drive motor corresponding to a black toner is previously rotated.

2 Claims, 11 Drawing Sheets

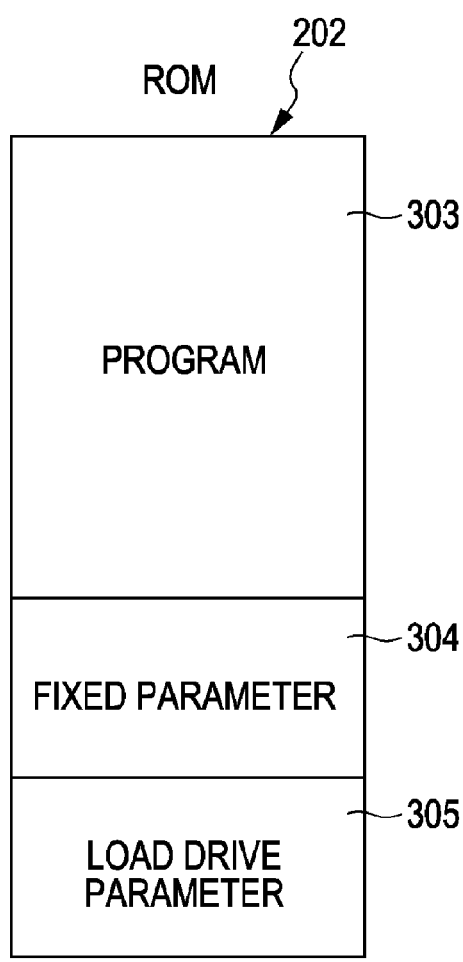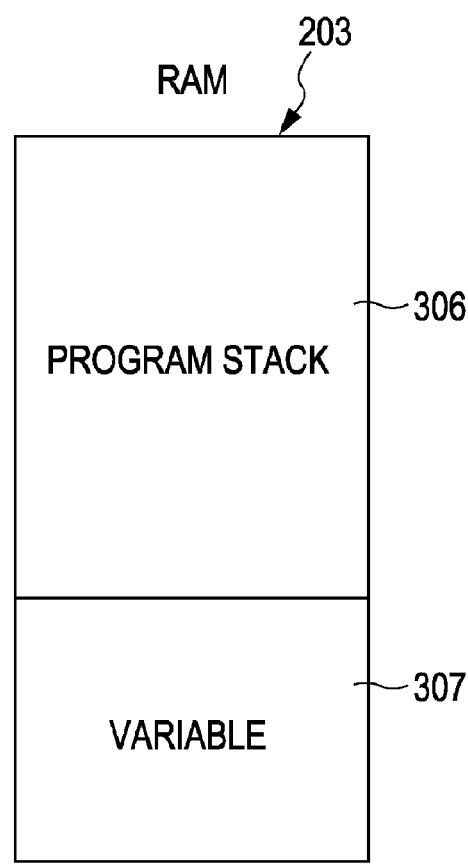

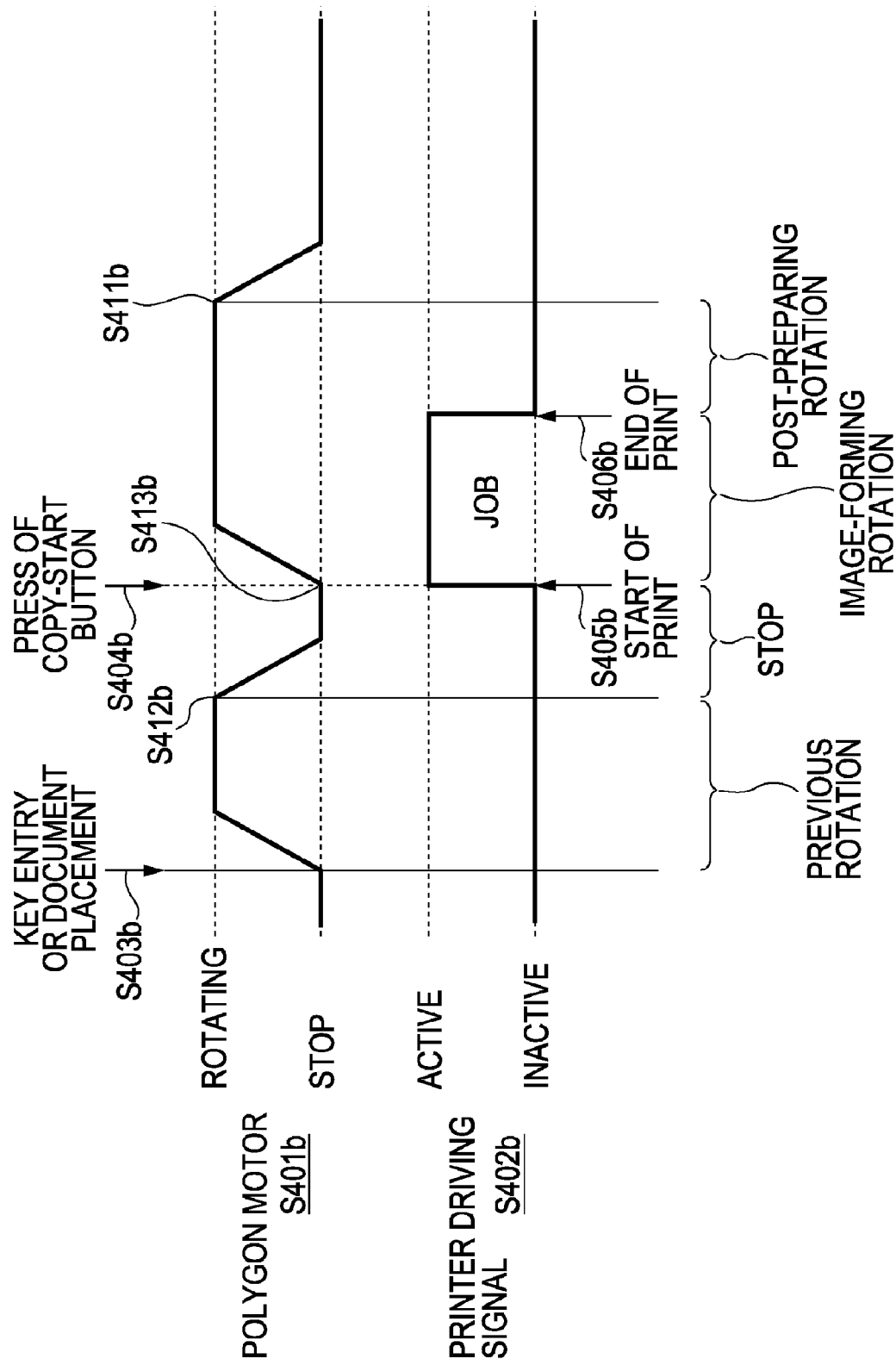

FIG. 6

| | PROCESS SPEED | DRIVE SPEED OF POLYGON MOTOR |
|---|---|---|
| MONOCHROME MODE | 200 mm/sec | 40000 PPS |
| FULL-COLOR MODE | 175 mm/sec | 35000 PPS |

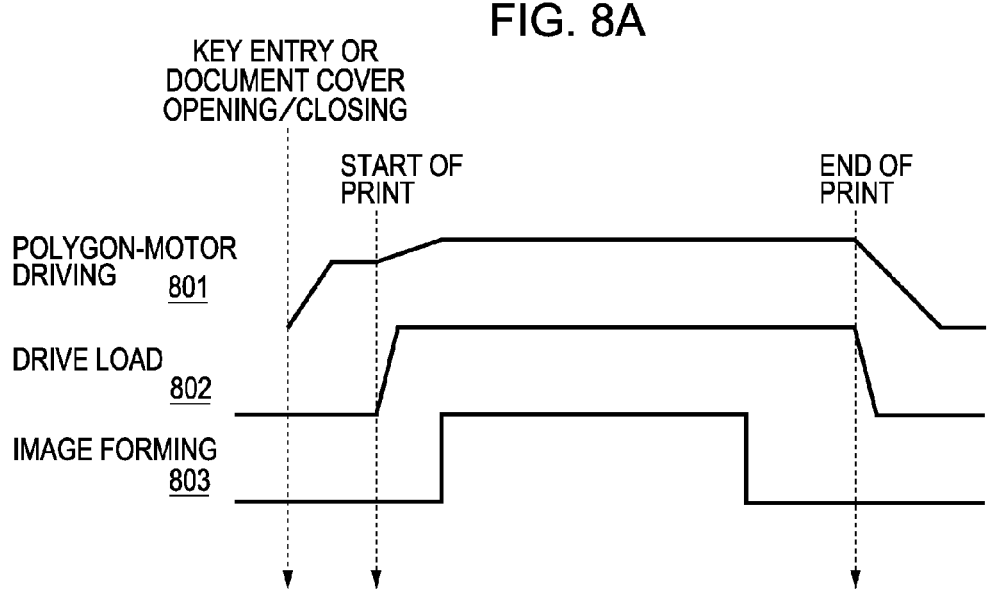
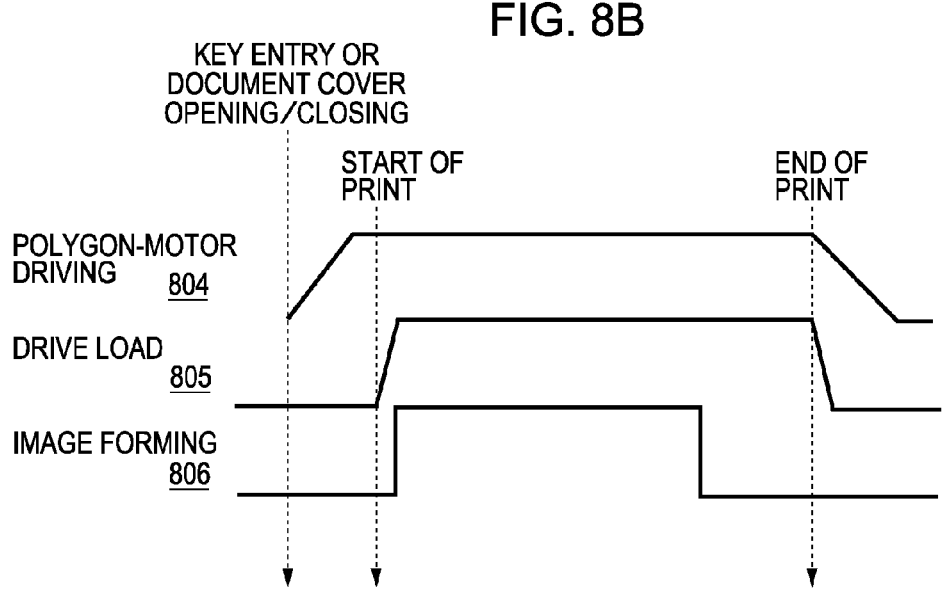

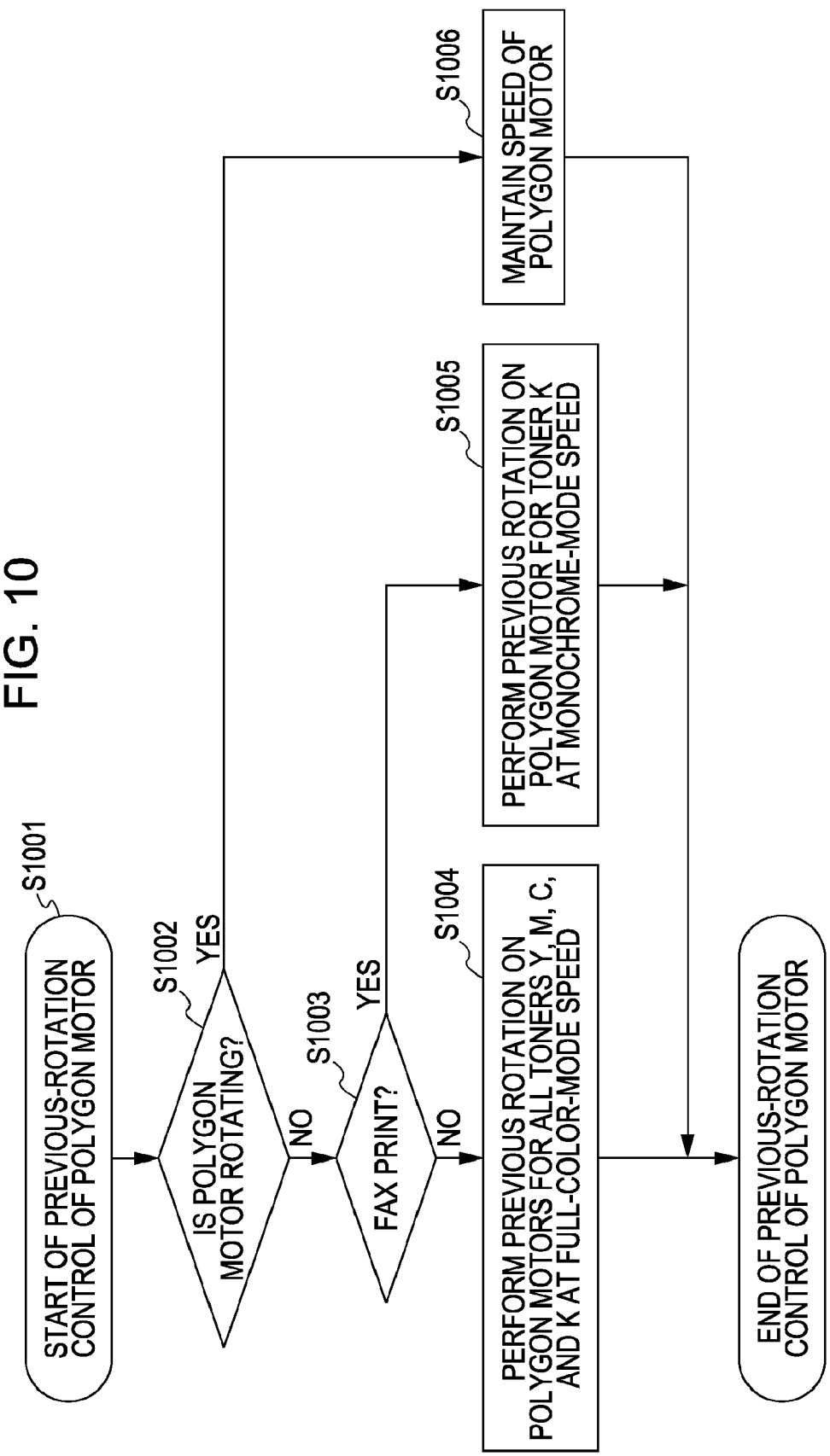

IMAGE FORMING APPARATUS

CROSS REFERENCE TO RELATED APPLICATIONS

This application is a Continuation of U.S. patent application Ser. No. 11/736,411 filed on Apr. 17, 2007 now U.S. Pat. No. 7,643,190, which claims the benefit of Japanese Application No. 2006-114314 filed Apr. 18, 2006, which are hereby incorporated by reference herein in their entirety.

BACKGROUND OF THE INVENTION

1. Field of the Invention

The present invention relates to an image forming apparatus that writes an electrostatic latent image on a photosensitive member by using a rotatable polygonal mirror (polygon scanner), and, in particular, to a reduction in first print time thereof.

2. Description of the Related Art

It is desired for image forming apparatuses, such as a copier and a printer, that an image be formed on different kinds of sheets at high speeds, with high quality, and with high precision. In many cases, an image forming apparatus that aims to enhance the speed uses, as an optical scanning device (optical system), a polygonal mirror drive motor for driving a laser beam and a rotatable polygonal mirror for deflecting the lager beam.

In such an image forming apparatus, when a start signal that indicates the start of a copying operation is input by entry of a copy start key from a user or of a print instruction from a computer, an initiation operation (e.g., high-pressure activation) used for an electrophotography process (e.g., charging or transferring) starts. In synchronism therewith, a polygonal mirror drive motor is activated from a stopped state or a low-speed rotation state to a high-speed rotation state required for image formation (i.e., the speed is shifted). After the polygonal mirror drive motor reaches a predetermined rotation speed, an image forming operation is performed. Such a sequence is typically used.

Since the polygonal mirror drive motor has a large interior force because it rotates a polygonal mirror, a long time is necessary for reaching a stable rotation state (activated state). In general, a time of 2 to 7 seconds is needed for rising from a stopped state or a low-speed rotation state to a high-speed rotation state. For this reason, a reduction in the time required for activation of the polygonal mirror drive motor is considered as one of major techniques for reducing a first copy time, i.e., a time from when the copy start button is pressed down to when a first sheet is ejected. Japanese Patent Laid-Open No. 7-273951 discloses an image forming apparatus that has a function of previously activating a polygonal mirror drive motor when pressing of a key of an operation portion other than a copy start key by a user is detected. Japanese Patent Laid-Open No. 2002-326386 discloses another image forming apparatus that has a plurality of process speeds and that allows an operator to select the speed of the previously rotated polygonal mirror drive motor.

An image forming apparatus that has a plurality of process speeds, for example, that has two image forming modes, i.e., monochrome and color modes, or that can switch the resolution of an image to be formed, has a plurality of stages for the number of revolutions (rotation speed) of a polygonal mirror drive motor. Generally, such an image forming apparatus determines information about the image forming mode or about the resolution with approximately the same timing as in reception of image information. Therefore, if a function of previously activating the polygonal mirror drive motor is performed, it is necessary to activate the polygonal mirror drive motor at any one of the plurality of stages for the rotation speed.

For an arrangement in which the rotation speed for the start of the polygonal mirror drive motor is selected or preset to a fixed value, if the selected rotation speed is inappropriate, a time for shifting to an appropriate rotation speed is necessary. This results in an undesirable increase in the first copy time (first print time).

SUMMARY OF THE INVENTION

The present invention provides a method for controlling an image forming apparatus. The image forming apparatus includes a first optical scanning portion and a second optical scanning portion. Each of the first and second optical scanning portions has a laser emitting unit, a rotatable polygonal mirror arranged to expose and scan a different image bearing member with laser light from the laser emitting unit, and a driving unit arranged to rotate the rotatable polygonal mirror. The image forming apparatus is capable of forming a color image by causing the first and second optical scanning portions to expose and scan the respective image bearing members and to transfer respective images to a moving medium. The method includes starting rotation control of controlling rotation of the driving unit; after starting rotation control of controlling rotation of the driving unit, forming a color image by using the first and second optical scanning portions in response to an instruction to start image formation of a color image and forming a monochrome image by using the first optical scanning portion without using the second optical scanning portion in response to an instruction to start image formation of a monochrome image; detecting a remaining amount of a developer used in forming the monochrome image or the color image; and performing the rotation control on the driving unit of the first scanning unit and not starting the rotation control on the driving unit of the second scanning unit if absence of a developer used for an image to be formed by the second optical scanning portion is detected and presence of a developer used for an image to be formed by the first optical scanning portion is detected.

The method according to the present invention can reduce first print time.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments of the present invention and, together with the description, serve to explain the principles of the present invention.

FIGS. 3A and 3B are diagrams of allocation in a ROM and RAM, respectively.

FIGS. 5A and 5B are timing charts in a previous-rotation control process.

FIG. 6 shows the relationship between an operation mode and a drive speed of a drive load.

FIGS. 8A and 8B are timing charts showing a comparison of a known example and the embodiment of the present invention in terms of first copy time.

FIG. 10 is a flowchart that shows a conditional judgment sequence performed when a previous rotation starts according to the second embodiment.

DESCRIPTION OF THE EMBODIMENTS

Figure 1:
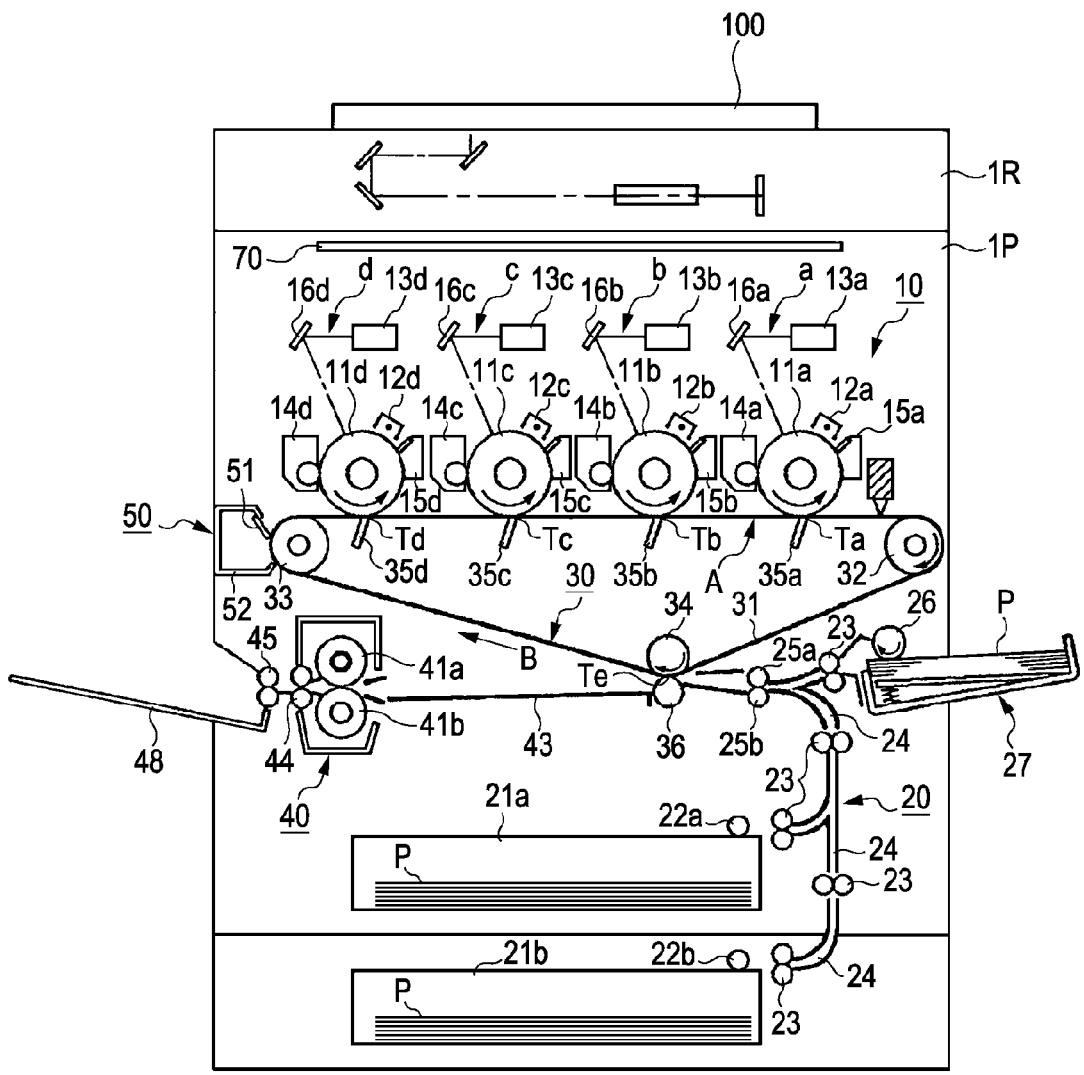
FIG. 1 is a longitudinal sectional view of an image forming apparatus according to an embodiment of the present invention.

Exemplary Embodiments of the present invention will now be described below with reference to the drawings, in which like reference characters designate the same or similar parts throughout the figures thereof.

First Embodiment

Structure of Image Forming Apparatus

FIG. 1 is a sectional view of an image forming apparatus according to a first embodiment. The image forming apparatus includes a document reader portion 1R and a printer portion 1P used when performing an operation of copying a document. A document cover 100 is provided in the document reader portion 1R. The document cover 100 is provided with an opening and closing sensor configured to issue an open and close signal to an image reader control unit, which will be described below, when detecting the opening of the document cover 100. The printer portion 1P includes the following main components. Photosensitive drums 11a, 11b, 11c, and 11d are image bearing members each being rotatable in a direction indicated by an arrow. The center of each of the photosensitive drums 11a, 11b, 11c, and 11d is supported by a shaft. Primary chargers 12a, 12b, 12c, and 12d, optical scanning devices (optical scanning units) 13a, 13b, 13c, and 13d, and developing units 14a, 14b, 14c, and 14d are disposed in the respective rotational directions of the photosensitive drums 11a, 11b, 11c, and 11d so as to face the peripheral surfaces of the photosensitive drums 11a, 11b, 11c, and 11d, respectively.

The primary chargers 12a, 12b, 12c, and 12d apply a uniform amount of charge to the respective surfaces of the photosensitive drums 11a, 11b, 11c, and 11d. Then, the photosensitive drums 11a, 11b, 11c, and 11d are exposed and scanned with light (e.g., laser light) modulated on the basis of record image signals by the optical scanning devices 13a, 13b, 13c, and 13d, respectively. Therefore, an electrostatic latent image is formed on each of the photosensitive drums 11a, 11b, 11c, and 11d. The electrostatic latent images are each visualized as a toner image by the developing units 14a, 14b, 14c, and 14d, which accommodate developers (toner) of four colors of black (K), cyan (C), magenta (M), and yellow (Y), respectively. The visualized toner images are transferred to an intermediate transfer belt 31 at image primary-transfer regions Ta, Tb, Tc, and Td. Toner particles that have not been transferred to a recording medium P and remain on the photosensitive drums 11a, 11b, 11c, and 11d are scraped off by cleaning devices 15a, 15b, 15c, and 15d, which are located downstream of the image primary-transfer regions Ta, Tb, Tc, and Td, respectively. Through the above-described process, toner images are successively formed using the toners.

A paper feed unit 20 includes cassettes 21a and 21b and a manual feed tray 27 for accommodating one or more recording media (movable medium) P and pickup rollers 22a, 22b, and 26 for supplying the recording media P one by one. Pairs of paper feed rollers 23 and a paper feed guide 24 transport to registration rollers 25a and 25b one of the recording media P supplied from the pickup rollers 22a, 22b, and 26. The registration rollers 25a and 26b supply the recording medium P to a secondary-transfer region Te so as to match with an image forming timing in an image forming unit 10.

An intermediate transfer unit 30 includes the intermediate transfer belt 31 as an intermediate transfer member (movable medium) or a bearing member (movable medium). The intermediate transfer belt 31 is stretched around a driving roller 32 for transmitting a driving force thereto, a tension roller 33, and a secondary transfer internal roller 34 and is rotatable in a direction indicated by an arrow B. The tension roller 33 applies a proper amount of tension to the intermediate transfer belt 31 by an urging force of a spring (not shown). The secondary transfer internal roller 34 faces the secondary-transfer region Te so that the intermediate transfer belt 31 is disposed therebetween. Examples of the material of the intermediate transfer belt 31 include polyimide (PI) and polyvinylidene fluoride (PVDF).

A primary transfer plane "A" is formed between the driving roller 32 and the tension roller 33. The driving roller 32 is a metal roller coated with a rubber layer (urethane or chloroprene) having a thickness of several millimeters so as to prevent slippage to the intermediate transfer belt 31. The driving roller 32 is rotatable by a pulse motor (not shown).

The tension roller 33 is urged by a pressure mechanism (not shown). The alignment of the tension roller 33 is adjustable, and a meandered state of the intermediate transfer belt 31 can be corrected. Primary transfer devices 35a, 35b, 35c, and 35d are disposed in the image primary-transfer regions Ta, Tb, Tc, and Td, respectively, at the undersurface of the intermediate transfer belt 31. A cleaning device 50 for cleaning an image forming surface of the intermediate transfer belt 31 is disposed downstream of the secondary-transfer region Te at the front side of the intermediate transfer belt 31. The cleaning device 50 includes a cleaner blade 51 and a waste-toner box 52 for accommodating waste toner. Examples of the material of the cleaner blade 51 include polyurethane rubber.

A fixing unit 40 includes a fixing roller 41a, a pressure roller 41b pressed to the fixing roller 41a, a transport guide 43, an inside paper-output roller 44, and an outside paper-output roller 45. The fixing roller 41a has a heat source, such as a halogen heater, therein. The pressure roller 41b may also have a heat source therein. The transport guide 43 guides the recording medium P to a nip of the fixing roller 41a and the pressure roller 41b. The inside paper-output roller 44 and the outside paper-output roller 45 guide the recording medium P ejected from between the fixing roller 41a and the pressure roller 41b to the outside of the apparatus (paper tray 48).

A control unit 70 includes a control substrate for controlling the operation of a mechanism inside each unit and a motor drive substrate (not shown). For example, a central processing unit (CPU), read-only memory (ROM), random-access memory (RAM), and various control circuits can be mounted on the control substrate. A control program, such as firmware, is stored in the ROM.

The operation of the color image forming apparatus will now be described below. When a start signal for an image forming operation is issued from an operation unit or other unit, the recording medium P is supplied from the cassette 21a by the pickup roller 22a one by one. Then, the recording medium P is guided in the paper feed guide 24 by the pair of paper feed rollers 23 and is transported to the registration rollers 25a and 25b. At this time, the registration rollers 25a and 25b are stalled, and the leading end of the recording medium P comes into contact with a nip of the registration rollers 25a and 25b and stops. Then, the registration rollers 25a and 25b start rotating so as to match with a timing of starting image formation by the image forming unit 10. The period during which the registration rollers 25a and 25b rotate is set such that the recording medium P is aligned with a toner image transferred to the intermediate transfer belt 31 by primary transfer in the secondary-transfer region Te.

In the image forming unit 10, when the above-described start signal is issued, a toner image formed on the photosensitive drum 11d, which is located most upstream in the direction of rotation of the intermediate transfer belt 31, is transferred to the intermediate transfer belt 31 by primary transfer. The toner image transferred to the intermediate transfer belt 31 by primary transfer is transported to the next primary-transfer region Tc. In the primary-transfer region Tc, image formation has been performed so as to be delayed by the time required for transportation of the toner image from the primary-transfer region Td. That is, a next toner image is transferred to the formed toner image so as to be aligned therewith. The alignment of multiple different-color images is called registration. The same process is repeated, so the four-color toner images are finally transferred to the intermediate transfer belt 31 by primary transfer.

Then, when the recording medium P enters the secondary-transfer region Te and comes into contact with the intermediate transfer belt 31, a high voltage is applied on a secondary transfer device 36 so as to match with a timing in which the recording medium P passes through. The four-color toner images formed on the intermediate transfer belt 31 through the foregoing process are transferred to the surface of the recording medium P. The recording medium P having the transferred toner images is precisely guided to the nip in the fixing unit 40 by the transport guide 43. Then, the toner images are fixed on the surface of the recording medium P by heat of the pair of rollers 41a and 41b in the fixing unit 40 and pressure of the nip. The recording medium P having the fixed toner images is transported to the outside of the apparatus (paper tray 48) by the inside paper-output roller 44 and the outside paper-output roller 45.

Control Block Diagram

Figure 2:
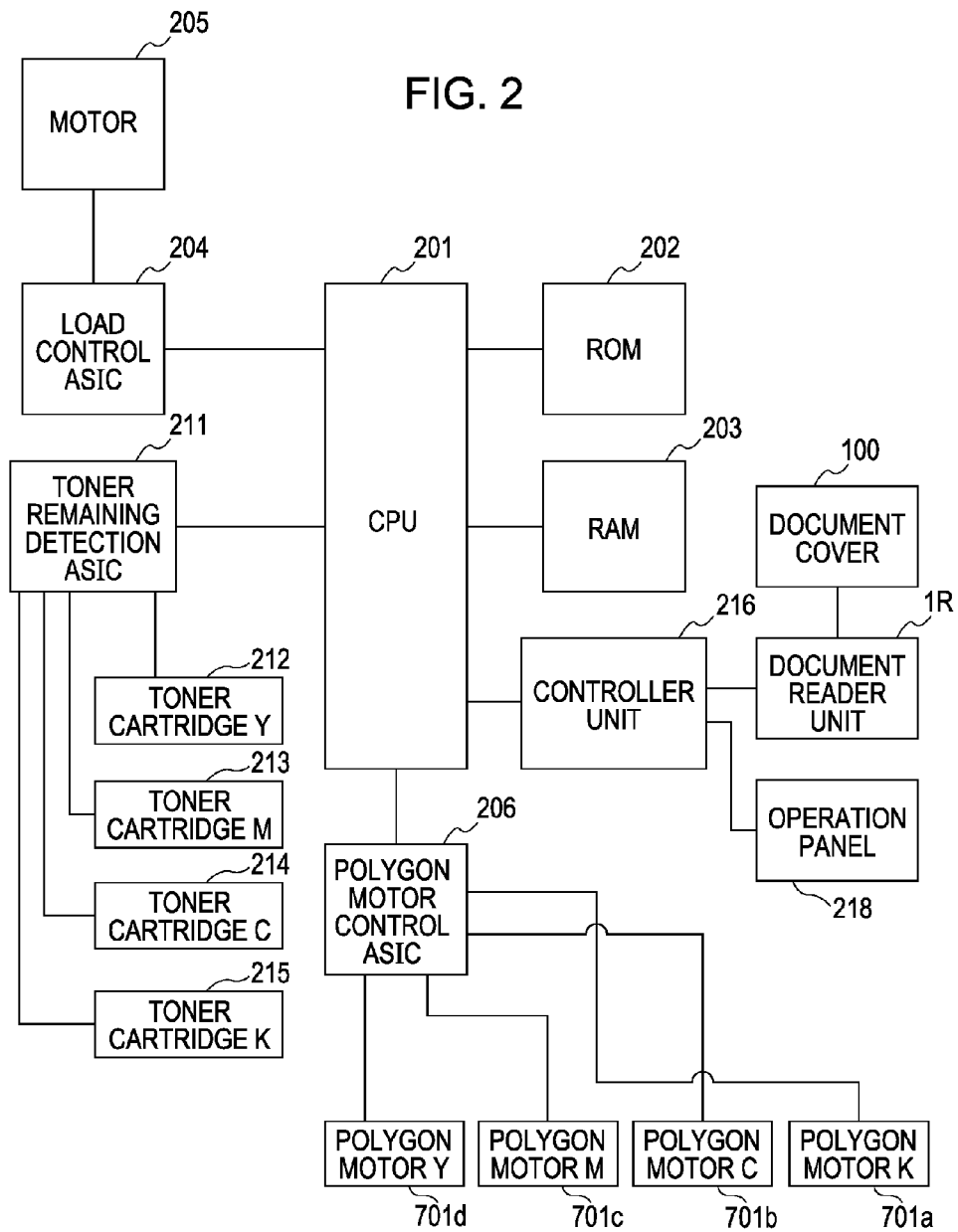
FIG. 2 is a control block diagram that shows control of a printer portion.

FIG. 2 is a control block diagram that shows control of the printer portion 1P according to this embodiment.

A CPU 201, a ROM 202, a RAM 203, and various control circuits (load control application-specific integrated circuit (ASIC) 204, toner remaining detection ASIC 211, polygonal mirror drive motor control ASIC 206, and controller unit 216) are incorporated in the control unit 70. A control program, such as firmware, is stored in the ROM 202.

The CPU 201 is a control microcomputer for controlling the drive load of printer portion 1P. The CPU 201 executes programs stored in the ROM 202 and the RAM 203, sets a control signal for the drive load with respect to the load control ASIC 204, and drives a motor 205. The CPU 201 causes the polygonal mirror drive motor control ASIC 206 to control driving of polygonal mirror drive motors (driving units) 701a, 701b, 701c, and 701d by specifying a parameter, such as a drive speed, with respect to the polygonal mirror drive motor control ASIC 206.

The CPU 201 can detect the amount of toner remaining in each of toner cartridges 215, 214, 213, and 212 for supplying toner to the photosensitive drums 11a, 11b, 11c, and 11d, respectively, via the toner remaining detection ASIC 211.

In response to pressing of a copy start button on an operation panel 218 by an operator (user), the controller unit 216 accepts a copy instruction (a print job is input and a start instruction is issued), issues a print instruction to the printer portion 1P, and transmits image data. The controller unit 216 also serves to read document image data in communication with the document reader portion 1R and to receive from the document reader portion 1R a signal indicating that the document cover (pressing plate) 100 was opened.

ROM and RAM

FIGS. 3A and 3B illustrate allocation in a storage area of the ROM 202 and that of the RAM 203, respectively. FIG. 3A shows data stored in the ROM 202. The data includes a program region 303, in which a program is stored, a parameter region 304, in which fixed parameter(s) required for execution of the program is/are stored, and a load drive parameter region 305, in which a load drive parameter used for driving a load, such as a motor, is stored. FIG. 3B shows a parameter map developed on the RAM 203. The parameter map includes a program stack 306, which is a stack region for execution of a program, and a variable region 307.

Optical Scanning Device

Figure 4:
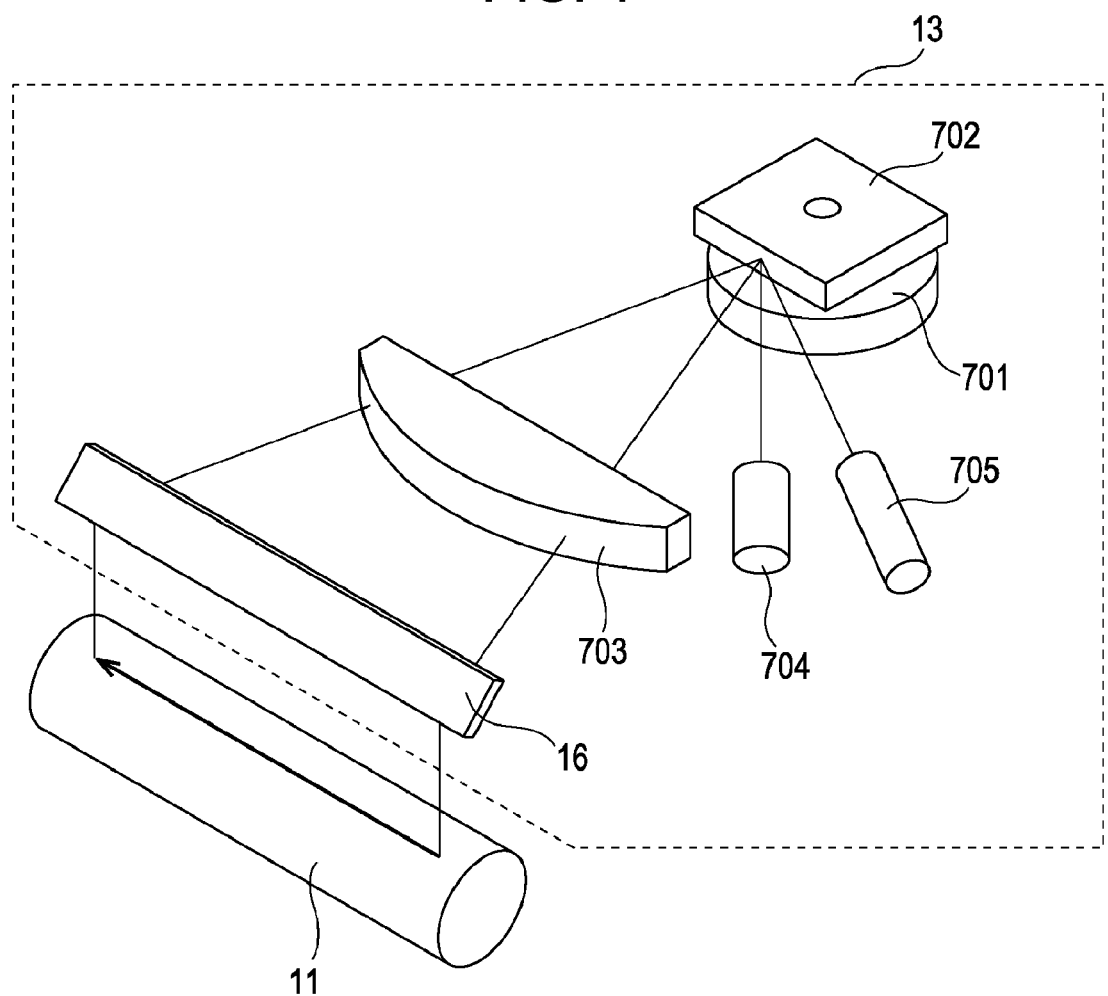
FIG. 4 illustrates a structure of an optical scanning device.

FIG. 4 illustrates a structure of the optical scanning device (optical scanning unit) 13. The optical scanning devices 13a, 13b, 13c, and 13d have the same structure, so the optical scanning device (a first optical scanning portion) 13a for black (K) used in monochrome image formation is described below as a representative. The optical scanning devices 13b to 13d correspond to a second optical scanning portion.

A polygonal mirror (rotatable polygonal mirror) 702 rotatable by the polygonal mirror drive motor 701 is disposed so as to face a laser diode (laser emitting unit) 705. An image forming lens 703 and a folding mirror 16 are disposed in a direction of reflection of laser light emitted from the laser diode 705 from the polygonal mirror 702 and of scanning. A beam sensor 704 for outputting a reference signal for a timing with which the photosensitive drum 11 is scanned is disposed in the vicinity of the image forming lens 703.

The laser diode 705 emits laser light modulated on the basis of an image signal. The laser light is reflected by the rotating polygonal mirror 702, passes through the image forming lens 703, and is reflected by the folding mirror 16. Then, the laser light reaches the photosensitive drum 11 and forms a latent image on the photosensitive drum 11.

Previous-Rotation Control Process

Figure 5A:
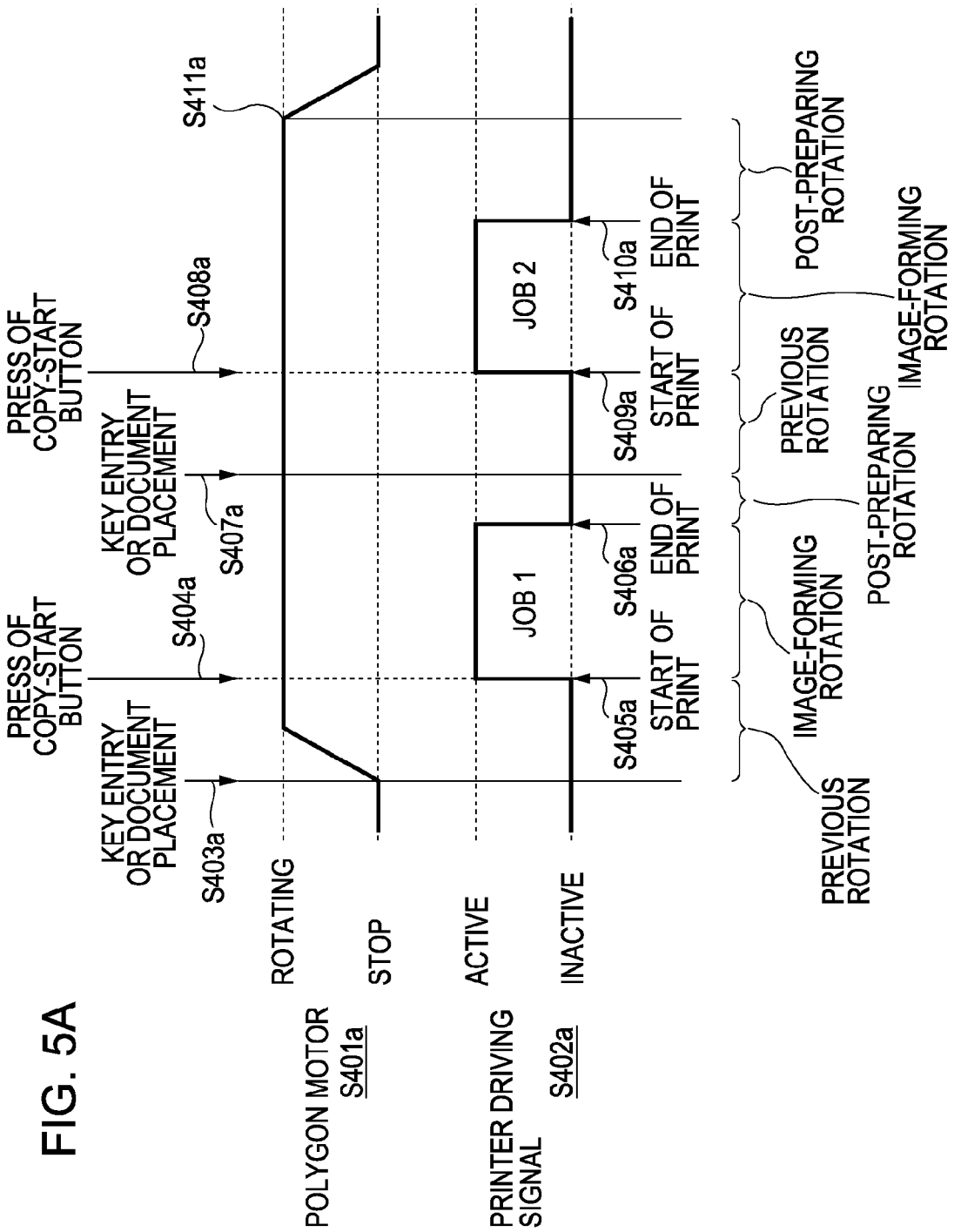

FIGS. 5A and 5B are timing charts occurring when a previous-rotation control is performed on the polygonal mirror drive motor 701 included in the optical scanning device according to the first embodiment of the present invention. FIG. 5A is a timing chart occurring when a print job is input while the polygonal mirror drive motor 701 is being rotated by the previous-rotation control. FIG. 5B is a timing chart occurring when a print job is not input while the polygonal mirror drive motor 701 is being rotated by the previous-rotation control.

In FIGS. 5A and 5B, S401a and S401b represent the rotation speed of the polygonal mirror drive motor 701, and S402a and S402b represent an operating signal (printer drive signal) indicative of the operation of a print job.

First, an operation shown in FIG. 5A will be described. When a button other than a copy start button on the operation panel 218 is pressed down by an operator (user) or the opening or closing of the document cover 100 in the document reader portion 1R is detected, as shown in S403a, a previous-rotation control (rotation control) is performed on the polygonal mirror drive motor 701. The CPU 201 rotates (activates) the polygonal mirror drive motor 701 via the polygonal mirror drive motor control ASIC 206. This is the previous-rotation control performed on the polygonal mirror drive motor 701. The CPU 201 sets a timer (not shown) when the polygonal mirror drive motor 701 starts rotating so as to measure the amount of time elapsed since the previous-rotation control started. If a predetermined amount of time elapses without any other operation from the user, the CPU 201 controls the polygonal mirror drive motor 701 to pause so as not to waste the life of the motor.

As described above, when a user presses the copy start button on the operation panel 218 down while the polygonal mirror drive motor 701 is rotating (i.e., before a predetermined amount of time from the start of the previous rotation elapses), (S404a), a print job 1 starts (S405a).

When the print job 1 is completed (S406a), the CPU 201 maintains the rotation of the polygonal mirror drive motor 701 in a predetermined period of time to prepare for a next print job. When the user presses a key on the operation panel 218 down or opens or closes the document cover 100 during rotation of the polygonal mirror drive motor 701 after the completion of the print job 1 (S407a), the rotation time of the polygonal mirror drive motor 701 is extended to perform a previous-rotation control. When the copy start button is pressed down again in this state (S408a), a print job 2 is started (S409a). After the print job 2 is completed (S410a), when the user does not perform any other operation during rotation of the polygonal mirror drive motor 701 after the completion of the print job 2, the polygonal mirror drive motor 701 stops after a predetermined amount of time elapses (S411a).

An operation occurring when the user does not input a print job (the user does not press the copy start button on the operation panel 218 down) during a previous-rotation control performed on the polygonal mirror drive motor 701 will now be described below with reference to FIG. 5B.

As with the case of FIG. 5A, when a button other than the copy start button on the operation panel 218 is pressed down by the operator (user) or the opening or closing of the document cover 100 in the document reader portion 1R is detected (S403b), a previous-rotation control is performed on the polygonal mirror drive motor 701. At this time, the CPU 201 rotates the polygonal mirror drive motor 701 via the polygonal mirror drive motor control ASIC 206 and sets the timer (not shown) at a predetermined period of time. If the predetermined period of time elapses without any other operation from the user, the polygonal mirror drive motor 701 is controlled to pause so as not to waste the life of the motor (S412b). If the user presses the copy start button down when the polygonal mirror drive motor 701 is at a standstill (S404b), the polygonal mirror drive motor 701 is activated again (S413b). After the rotation of the polygonal mirror drive motor 701 is stabilized, an image formation operation starts (S405b). After the print job is completed (S406b), the CPU 201 maintains the rotation of the polygonal mirror drive motor 701 in a predetermined period of time to prepare for a next print job, as with the case of FIG. 5A. When the user does not perform any operation in the predetermined period of time, the polygonal mirror drive motor 701 is stopped (S411b).

Operation Mode and Drive Speed

FIG. 6 shows the relationship between an operation mode and a drive speed of the drive load according to the first embodiment. A monochrome mode 501 is a mode that forms a monochrome (black-and-white) image by using only a black station among multiple stations provided in an image forming apparatus. A full-color mode 502 is a mode that forms a full-color image by using all the multiple stations provided in the image forming apparatus. A process speed 503 represents the image forming speed in each of the monochrome mode and the full-color mode. A polygon-motor drive speed 504 represents the rotation speed (drive speed) of the polygonal mirror drive motor 701 in each of the monochrome mode and the full-color mode.

In the first embodiment, the process speed in the monochrome mode (second speed) is higher than that in the full-color mode (first speed). Therefore, the number of printable sheets per unit time in the monochrome mode is greater than that in the full-color mode. For a similar reason, the scan speed of the polygonal mirror drive motor 701 in the monochrome mode is higher than that in the full-color mode.

In order to start image formation in the monochrome mode while the polygonal mirror drive motor 701 is previously rotated at the speed in the full-color mode (35,000 PPS), it is necessary to accelerate the rotation speed of the polygonal mirror drive motor 701 to that in the monochrome mode (40,000 PPS). In contrast, in order to start image formation in the full-color mode while the polygonal mirror drive motor 701 is previously rotated at the speed in the monochrome mode (40,000 PPS), it is necessary to decelerate the rotation speed of the polygonal mirror drive motor 701 to that in the full-color mode (35,000 PPS).

The time required for changing the speed for acceleration is shorter than that for deceleration. Therefore, if the image formation mode is unknown, the polygonal mirror drive motor 701 is previously rotated at the speed in the full-color mode.

Determination Sequence

Figure 7:
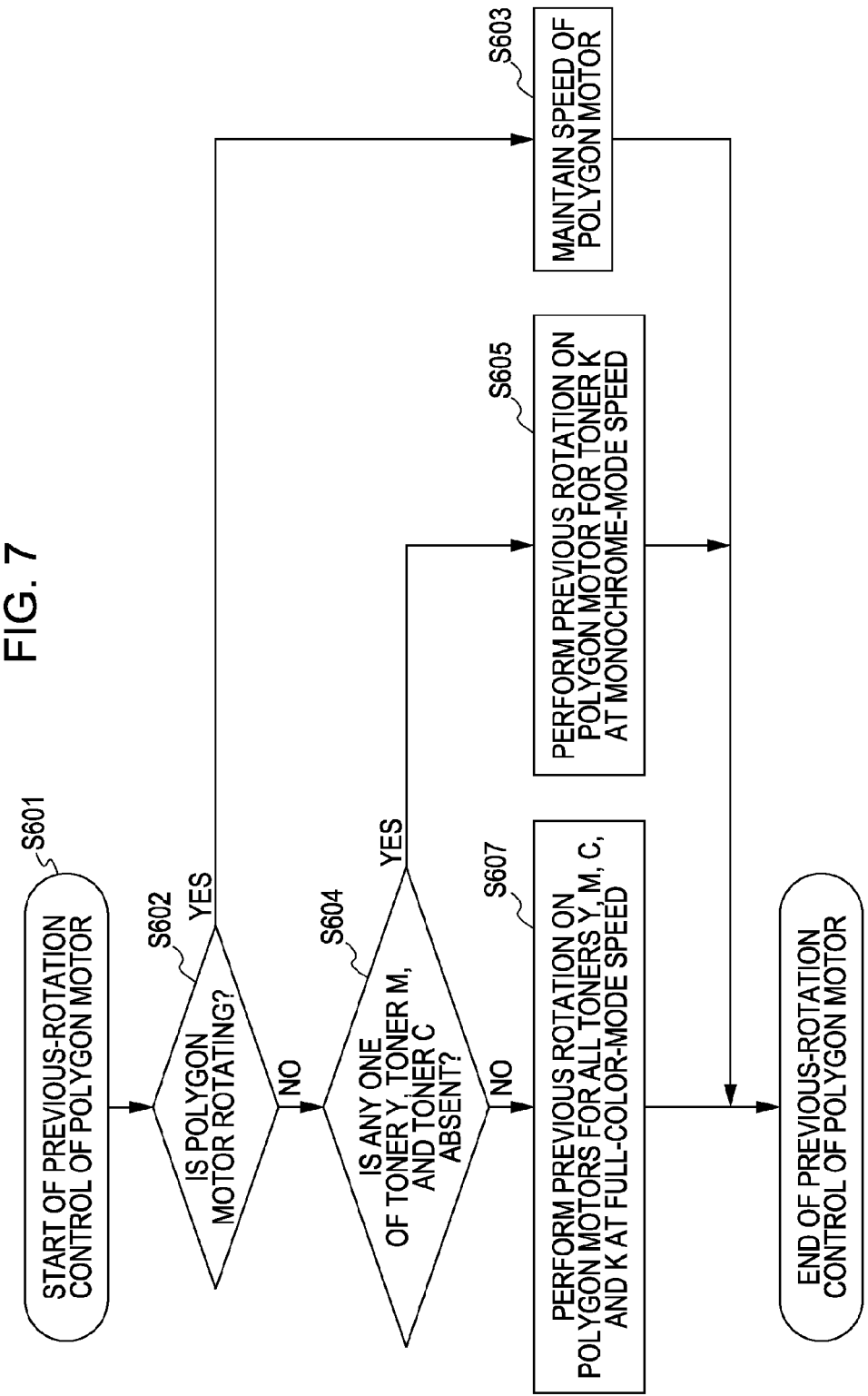
FIG. 7 is a flowchart that shows a conditional judgment sequence performed when a previous rotation starts.

FIG. 7 is a flowchart that shows a conditional judgment sequence performed for starting a previous rotation of the polygonal mirror drive motor 701. The processing shown in this flowchart is executed by the CPU 201 on the basis of a program stored in the ROM 202. In step 601 (hereinafter, abbreviated as "S601", the same applies to the subsequent steps), the processing for the previous rotation of the polygonal mirror drive motor 701 starts. In S602, it is determined whether the polygonal mirror drive motor 701 is rotating at a speed that can form an image. If it is determined that the polygonal mirror drive motor 701 is rotating at a speed that can form an image (YES in S602), the rotation state of the polygonal mirror drive motor 701 is maintained in S603.

If, in S602, it is determined that the polygonal mirror drive motor 701 is not rotating (or is rotating at a speed that is lower than that for image formation) (NO in S602), the presence or absence of each of the color toners is determined in S604. If, in S604, it is determined that all the color toners Y, M, and C remain (NO in S604), the polygonal mirror drive motor 701 corresponding to each of all the toners Y, M, C, and K is previously rotated at the rotation speed for the full-color image formation (35,000 PPS) in S607. If, in S604, it is determined that any one of the toners Y, M, and C is absent (YES in S604), a full-color image cannot be formed, and therefore, the polygonal mirror drive motor 701 corresponding to the toner K is previously rotated at the drive speed in the monochrome mode (40,000 PPS) in S605.

Determination Sequence

FIGS. 8A and 8B are timing charts showing a comparison of a known example and the embodiment of the present invention in terms of first copy time in a case in which any one of the color toners Y, M, and C is absent. FIG. 8A is a timing chart that shows the first copy time in such a case according to a known example. FIG. 8B is a timing chart that shows the first copy time in such a case according to the embodiment of the present invention.

Reference numerals 801 and 804 represent the drive timing of the polygonal mirror drive motor 701. Reference numerals 802 and 805 represent the drive timing of the drive load. Reference numerals 803 and 806 represent the image forming timing. In FIG. 8A, the previous-rotation speed of the polygonal mirror drive motor 701 in response to key entry or the opening or closing of the document cover is the full-color image forming speed, as described above. Therefore, if any one of the color toners is absent, it is necessary to accelerate the rotation speed of the polygonal mirror drive motor 701 to the monochrome image forming speed.

As a result, because the timing for starting image formation is delayed by a speed change time, the first copy time is also delayed correspondingly. In contrast, in FIG. 8B, which shows the embodiment of the present invention, if any one of the color toners Y, M, and C is absent, because it is obvious that only a monochrome print instruction is to be issued, the polygonal mirror drive motor 701 is previously rotated so as to reach the monochrome image forming speed in response to key entry or the opening or closing of the document cover. As a result, compared with FIG. 8A, which shows a known example, the first copy time can be reliably reduced by a time required for changing the speed of the polygonal mirror drive motor 701.

In the above embodiment, a copier is described as an example. However, the present invention is also applicable to a case in which a print instruction is sent from a host computer. In this case, the start signal is a signal for selecting an apparatus that will perform remote printing sent from the host computer to an image forming apparatus.

The above embodiment describes a previous rotation performed on the polygonal mirror drive motor 701. However, the present invention is also applicable to previous driving of a fixing device. That is, when a target fixing temperature is different depending on the mode (monochrome or color) or the type of a recording medium, the fixing device is previously driven so as to reach the target fixing temperature.

A case of a breakdown in a part of the image forming unit can also be realized, as in a case in which any one of color toners is absent.

Second Embodiment

Figure 9:
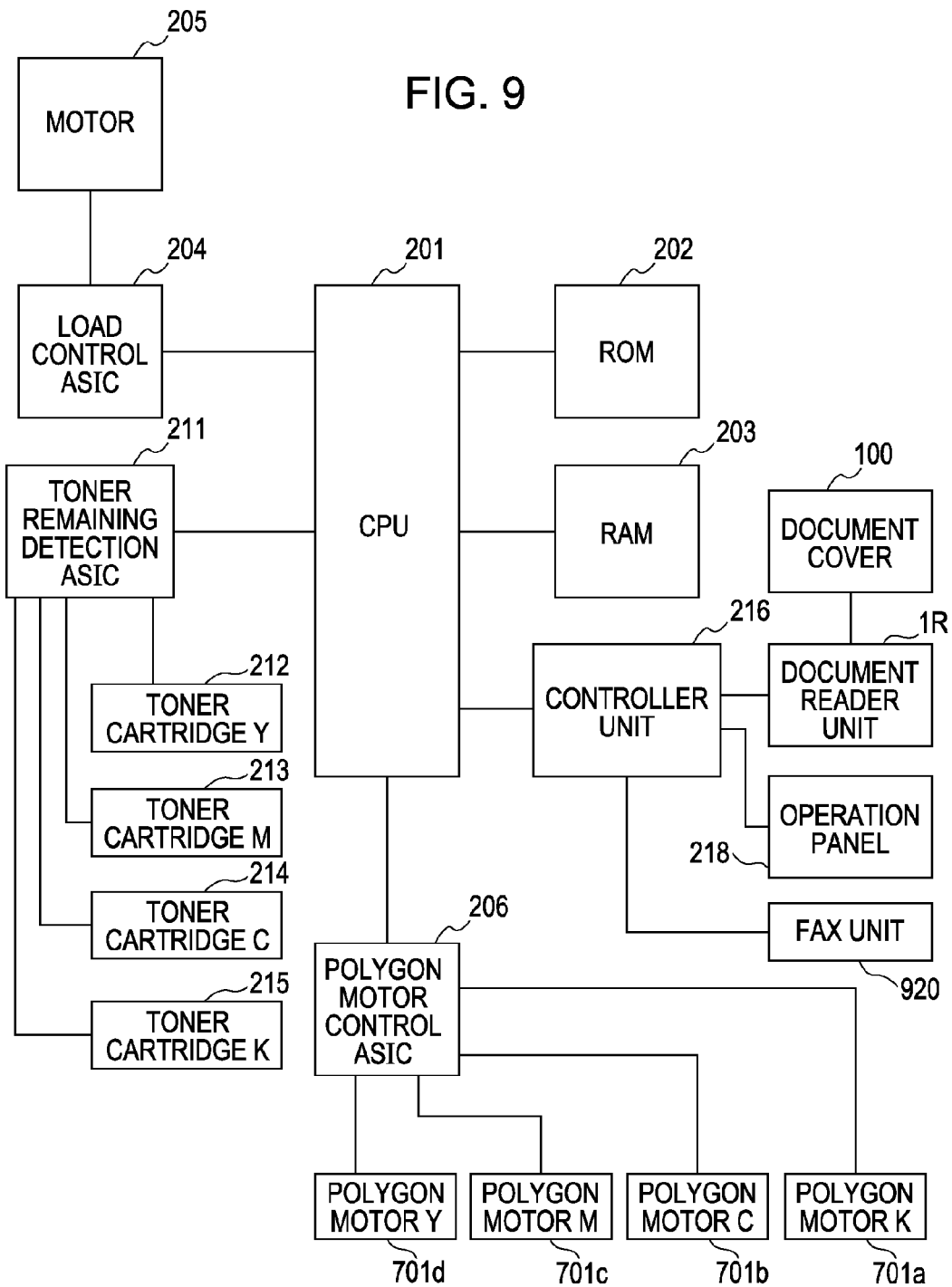
FIG. 9 is a control block diagram that shows control of a printer portion according to a second embodiment of the present invention.

FIG. 9 is a control block diagram that shows control of a printer portion 1P in an image forming apparatus according to a second embodiment of the present invention. The fundamental structure of the image forming apparatus according to the second embodiment is substantially the same as that in the first embodiment. The image forming apparatus according to the second embodiment has a facsimile (FAX) receiving function and can print facsimile data received by a FAX unit 920 in monochrome. In addition, because a FAX reception start signal, which indicates that FAX data will be transmitted, can be received, the image forming apparatus can prepare for printing, even before all FAX data is received.

FIG. 10 is a flowchart that shows a conditional judgment sequence performed for starting a previous rotation of a polygonal mirror drive motor 701. The processing shown in this flowchart is executed by a CPU 201. In S1001, the processing for the previous rotation of the polygonal mirror drive motor 701 starts. In S1002, it is determined whether the polygonal mirror drive motor 701 is rotating at a speed that can form an image. If it is determined that the polygonal mirror drive motor 701 is rotating at a speed that can form an image (YES in S1002), the rotation state of the polygonal mirror drive motor 701 is maintained in S1006.

If, in S1002, it is determined that the polygonal mirror drive motor 701 is not rotating (or is rotating at a speed that is lower than that for image formation) (NO in S1002), it is determined whether image forming data is to be formed in a FAX image forming mode in S1003. The determination about the FAX image forming mode is based on the CPU 201 receiving a signal from a controller unit 216 before the starting of image forming operation. Generally, for reception of a FAX image, a certain length of time is required to receive all data through telephone lines. Therefore, if information indicating whether the job is a FAX job or not can be received in advance, the polygonal mirror drive motor 701 can be previously rotated by using a data receiving time. If, in S1003, it is determined that the data is not a FAX output (NO in S1003), the polygonal mirror drive motor 701 corresponding to each of all the toners Y, M, C, and K is previously rotated at the drive speed in the full-color mode (S1004). If, in S1003, it is determined that the data is a FAX output (YES in S1003), the polygonal mirror drive motor 701 corresponding to the toner K is previously rotated at the drive speed in the monochrome mode (S1005).

This embodiment is based on the premise that data received by a FAX transmission tends to be a monochrome image. Similarly, on the premise that an automatic tone correction image tends to be a color image, when the automatic tone correction image is set, all the polygonal mirror drive motors 701 are previously rotated. This can reduce the first print time.

As described above, according to the embodiment of the present invention, in the case of data received by a FAX transmission, only the polygonal mirror drive motor 701 corresponding to the black toner is previously rotated at the drive speed in the monochrome mode. Therefore, compared with a case in which the polygonal mirror drive motors 701 are previously rotated at the drive speed in the full-color mode and then the speed is changed to the drive speed in the monochrome mode, the first print time can be reduced.

The present invention can also be achieved by supplying a storage medium that stores program code (software) that performs the functions according to the foregoing embodiments to a system or an apparatus and by causing a computer (or CPU or MPU) of the system or the apparatus to read and execute the program code stored in the storage medium.

In this case, the program code itself read out of the storage medium realizes the functions of the above-described embodiments.

Examples of the storage medium for supplying the program code include, but are not limited thereto, a floppy disk, a hard disk, a magneto-optical disk (MO), an optical disk, such as a compact disk recordable (CD-R), a CD-Rewritable (CD-RW), a digital versatile disk ROM (DVD-ROM), a DVD-RAM, a DVD-RW, and a DVD+RW, magnetic tape, a nonvolatile memory card, and a ROM. The program code can be downloaded via a network.

The functions of the embodiments described above can be realized not only by execution of program code read by a computer but also by performance of actual processing in part or in entirety by an operating system (OS) running on a computer in accordance with instructions of the program code.

In addition, the functions of the embodiments described above can be realized by, after writing of the program code read out of the storage medium into a memory of a function expansion board of a computer or a memory of a function expansion unit connected to a computer, execution of some of or all of actual processing by a CPU in the function expansion board or in the function expansion unit in accordance with instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An image forming apparatus for forming an image with toners of a plurality of colors, comprising:

a first image forming unit including:
   a first photosensitive member;
   a first light source configured to emit a laser beam for forming an electrostatic image on the first photosensitive member;
   a first rotatable polygonal mirror configured to deflect the laser beam emitted from the first light source so that the laser beam scans the photosensitive member; and
   a first developing unit configured to develop the electrostatic image formed on the first photosensitive member with a toner of a first color;

a second image forming unit including:
   a second photosensitive member;
   a second light source configured to emit a laser beam for forming an electrostatic image on the second photosensitive member;
   a second rotatable polygonal mirror configured to deflect the laser beam emitted from the second light source so that the laser beam scans the photosensitive member; and
   a second developing unit configured to develop the electrostatic image formed on the second photosensitive member with a toner of a second color;

a detection unit configured to detect a remaining amount of the toner of the first color held by the second developing unit; and a control unit configured to determine whether or not it is possible to form an image with the toner of the first color based on a detection result of the detection unit, to control the first rotatable polygonal mirror and the second rotatable polygonal mirror so that the first and second rotatable polygonal mirrors rotate at a predetermined rotation speed before the first light source and the second light source emit the laser beams based on image data, in a case where it is determined that it is possible to form an image with the toner of the first color, and to control the second rotatable polygonal mirror so that the second rotatable polygonal mirror rotates at the predetermined rotation speed before the second light source emits the laser beam based on the image data and not to control a rotation speed of the first rotatable polygonal mirror, in a case that it is determined that it is not possible to form an image with the toner of the first color.

2. The image forming apparatus according to claim 1, wherein the first color is a chromatic color and the second color is an achromatic color, and wherein the detection unit detects a remaining amount of the toner of the chromatic color.

* * * * *